United States Patent [19]

Kurt

[11] Patent Number: 4,549,429
[45] Date of Patent: Oct. 29, 1985

[54] METHOD OF CHECKING FOR HYDRAULIC LEAKAGE

[75] Inventor: Lynn E. Kurt, Dubuque, Iowa

[73] Assignee: Deere & Company, Moline, Ill.

[21] Appl. No.: 557,709

[22] Filed: Dec. 2, 1983

[51] Int. Cl.⁴ ............................................ G01M 3/26
[52] U.S. Cl. ..................................................... 73/40
[58] Field of Search .................. 73/40, 46, 49.1, 49.2, 73/49.3, 168

[56] References Cited

U.S. PATENT DOCUMENTS

| | | | |
|---|---|---|---|
| 3,360,982 | 1/1968 | Mitchell et al. | 73/40 |
| 3,438,247 | 4/1969 | Lotti et al. | 73/40 |
| 3,584,500 | 6/1971 | Diehl et al. | 73/40 X |
| 3,748,898 | 7/1973 | Louis et al. | 73/40 X |
| 4,480,464 | 11/1984 | Whisenard | 73/40 |

*Primary Examiner*—Thomas Wyse

[57] ABSTRACT

Leakage detection method for closed center hydraulic circuit wherein the existence of a leak within the circuit is indicated by changes in the RPM level of prime mover.

2 Claims, 3 Drawing Figures

METHOD OF CHECKING FOR HYDRAULIC LEAKAGE

BACKGROUND OF THE INVENTION

The present invention relates to method of detecting leakage in a hydraulic circuit.

A conventional hydraulic circuit such as found on an off-road vehicle to operate control cylinders associated with a vehicle component, for example, a loader bucket, boom, etc., includes in essential part, a pump driven by the vehicle's engine, a sump, and a control valve responsible for selectively porting hydraulic fluid to the various cylinders. The hydraulic circuit inclusive of the cylinders will contain a plurality of O-rings, seals, check valves and other constituent components which are subject to develop leakage. The presence of excessive leakage results in heat build up further degrading the component. Further, leakage precipitates a drop in circuit pressure requiring an increased power input to the circuit to compensate for the drop in pressure and, thereby, increases the fuel consumption rate of the engine.

One conventional method of detecting leakage within a hydraulic circuit involves interrupting the circuit at various points, each point relating to a particular circuit branch identified with a particular cylinder and introducing a flow meter to the circuit. The engine is started with all components in neutral. Should the flow meter register, a flow leakage is is indicated.

Another conventional method of detecting circuit leaks involves interrupting the circuit at various points, each relating to a particular circuit branch identified with a particular cylinder and introducing a pressure gage. The particular cylinder relating to a particular branch, previously set in a maximum or minimum position, is further urged to the maximum or minimum position, respectively, i.e., max to max or minimum to minimum. Should the pressure gage indicate a drop in circuit pressure, a leak is indicated.

Each of the conventional methods utilize relatively costly instrumentation. Further, the methods are time consuming and by interrupting the circuit create a further potential for leakage and the instrumentation is removed at the interruption point when the circuit is mended. Another disadvantage of the conventional methods is their inability to detect leaks of relatively small magnitudes.

SUMMARY OF THE INVENTION

It is an object of the present invention to present a method of hydraulic circuit leakage detection which does not require the disruption of the circuit to identify circuit leakage.

It is a further objective of the present invention to present a method which produces an audibly discernible drop in engine revolution (RPM) should a leak be present in the hydraulic circuit.

The method involves bypassing the governor associated with the fuel delivery system of an engine and setting the engine to a specific RPM. The circuit pump is then destroked. Should there be present in the circuit a leak between the pump and output side of the control valve, the engine will experience an increase in RPM. To ascertain whether there is a leak in a particular circuit branch, the pump is returned to stroke and the engine RPM is reset to specific level. Each function, e.g. cylinder, having been previously set at maximum or minimum position, the control valve is then operated to sequentially cause a particular cylinder to respond to either maximum or minimum position, respectively (i.e. max to max or min to min). Should a leak be present in that branch of the circuit between the control valve and a particular cylinder, an audible reduction in engine RPM will result.

DESCRIPTION OF THE PREFERRED EMBODIMENT

Figure 1:
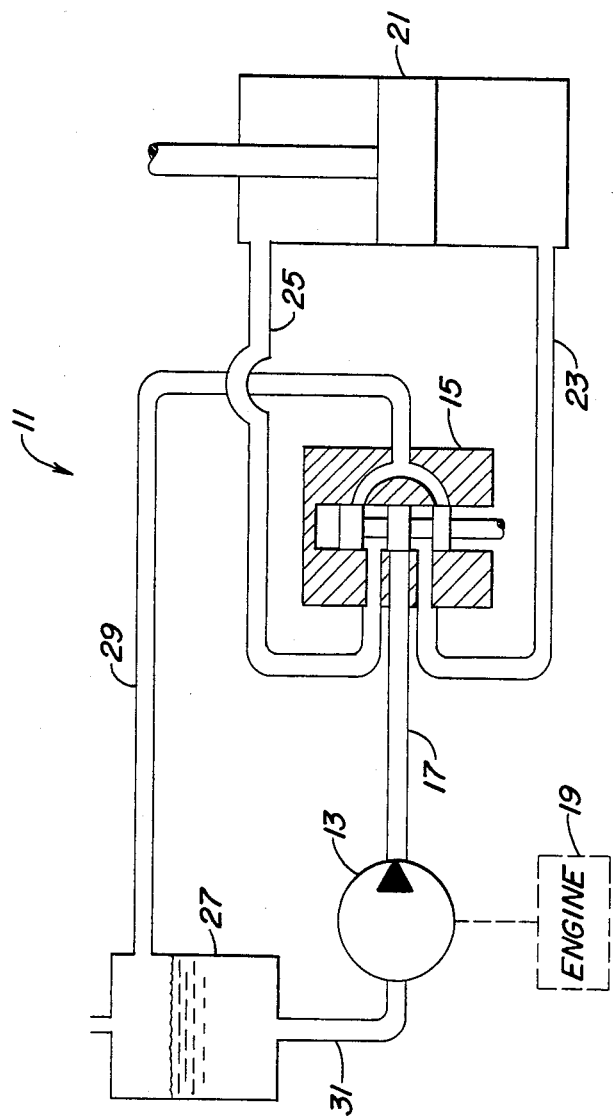
FIG. 1 is a schematic representation of a neutral position closed-center hydraulic circuit suitable to leak detection method of the present invention.

Referring to FIG. 1, a hydraulic circuit, generally indicated as 11, of the type particular suited to the leak detection method of the present invention includes a variable displacement pump 13 in fluid communication to a control valve 15 through line 17. An engine 19 drives the pump 13 in a conventional manner. A first hydraulic cylinder 21 receives hydraulic fluid from control valve 15 in a conventional manner through lines 23 and 25. A sump 27 is in fluid communication with the control valve 15 through line 29 and pump 13 through line 31. The circuit 11 operates in a conventional manner well known to those skilled in the art. Further, it is understood that a branch of the circuit, e.g. lines 23 and 25, and cylinder 21, may include any number of additional cylinder connected in series or parallel. Still further, it is understood that the circuit may include additional branches arranged in a conventional manner.

Figure 2A:
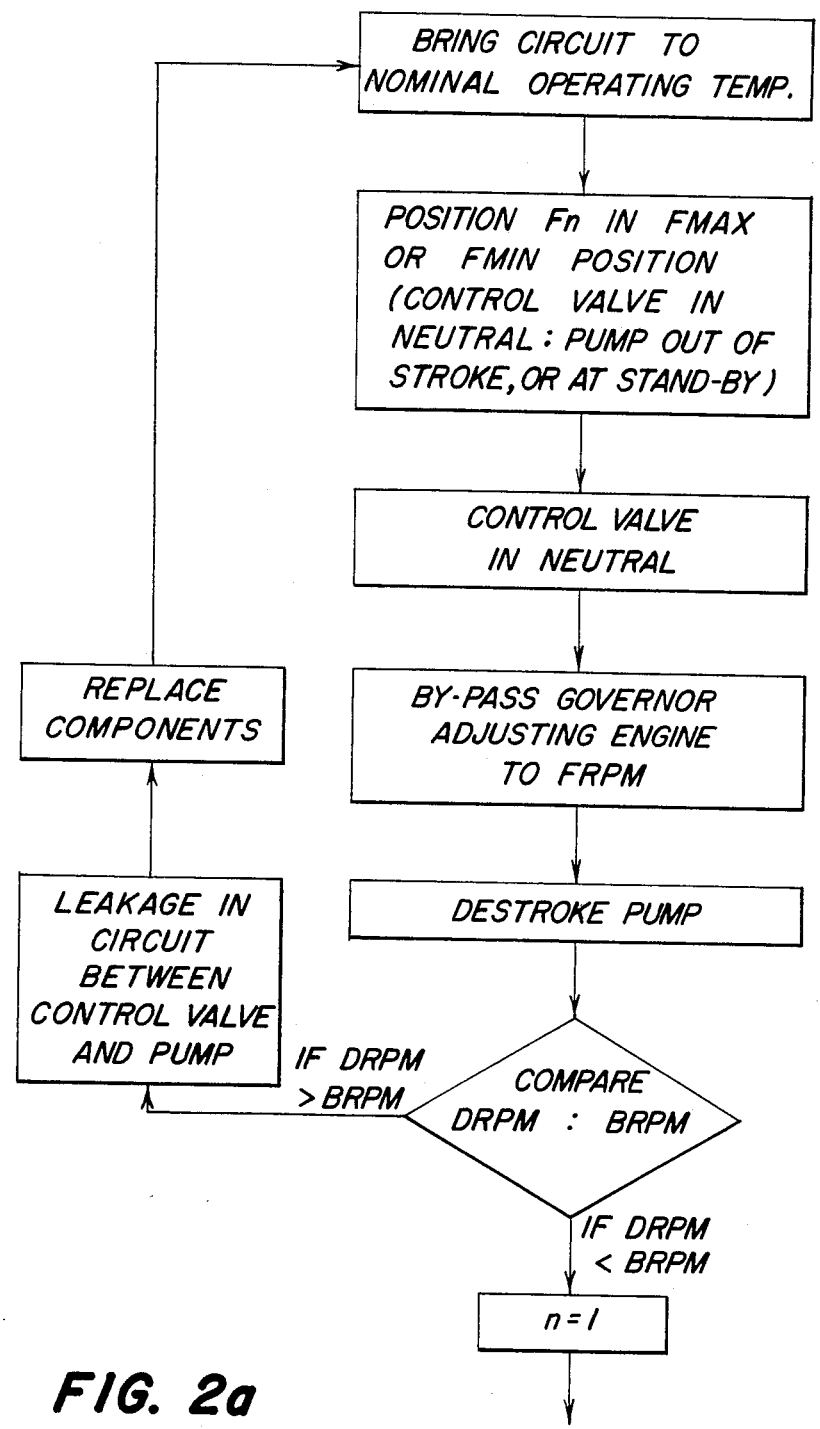
FIGS. 2 and 2b are a flow chart presentation of the present invention.
Figure 2B:
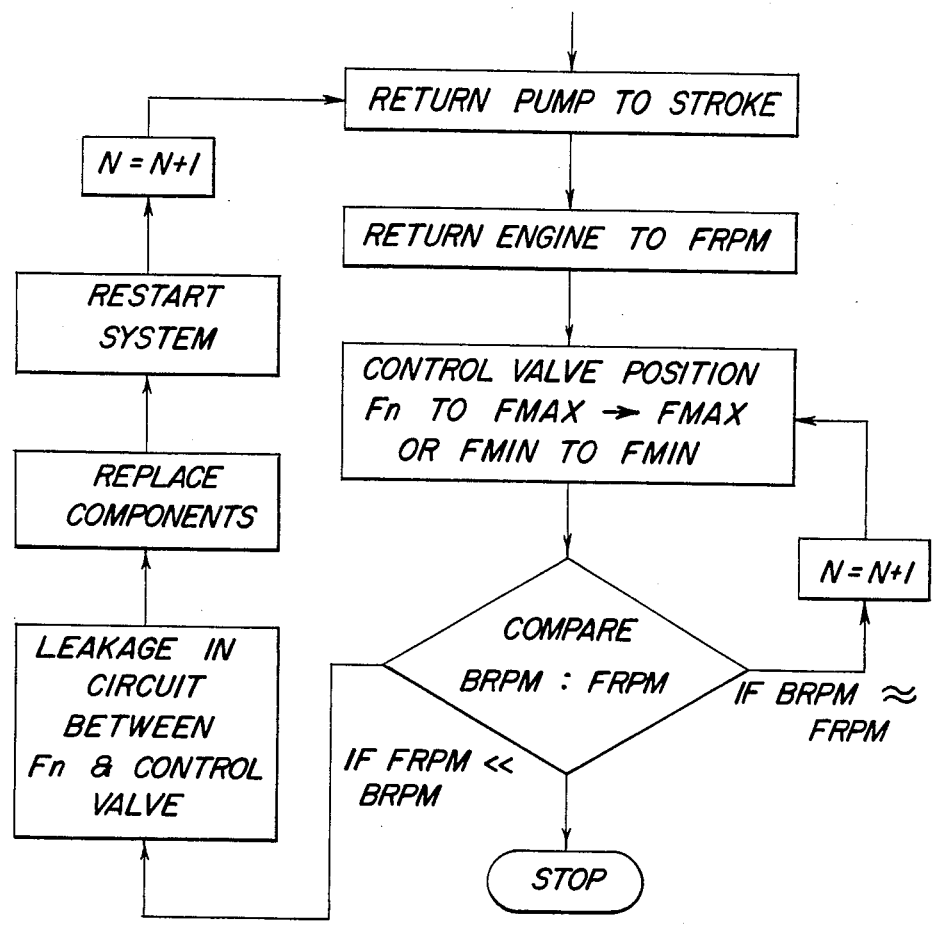

Referring more particularly to FIGS. 2a and 2b, to detect leakage within the circuit. The engine 19 is started and allowed to bring the circuit 11 up to operating temperature. All cylinders 21 (Fn) are then set in a maximum (Fmax) or minimum (Fmin) position and the control valve is placed in neutral placing pump out of stroke. The engine is then set at a high RPM (FRPM), e.g., 1,800 to 2,000. The fuel delivery system governor (not shown) is then bypassed in a conventional manner. By bypassing the govenor associated with the fuel delivery system, the engine 19 is no longer able to respond to delivering increased power to the pump 13 on demand, i.e., fuel is delivered to engine at a fixed rate. The pump 13 is then manually destroked which reduces the feed pressure, i.e. the fluid pressure in line 17. At this point, should there be a leak present in the circuit between the pump 13 and output side of control valve 15 an increase in engine RPM (DRPM) will be detected.

It is noted that no hydraulic circuit is completely leakage free. Therefore, the change in engine RPM (DRPM) should be some base line value (BRPM) to indicate leakage beyond a permissible amount. The base line value (BRPM) will vary depending on the particular circuit and, therefore, should be experimentally determined.

To ascertain whether there is leakage in a particular circuit branch, i.e. Fn, one returns pump 13 to stroke which increases the feed pressure to standby level. An engine is the set to FRPM. A particular branch cylinder Fn is then operated through the control valve in a conventional manner to an extreme position, i.e. if previously displaced to maximum the control valve is positioned for further maximum displacement or vice versa.

If there is a leak in circuit branch, the engine will experience an extreme decrease in RPM (DRPM). If there is a leakage determined to be present, the circuit can be shut off and the defective component repaired or replaced. These procedures are then repeated separately on the individual circuit branches.

I claim:

1. A method of detecting leakage in a closed center hydraulic circuit driven by a prime mover in driven feedback responsive communication with a variably displaceable pump unit, said hydraulic circuit including said pump unit, in fluid communication with a control valve for selectively directing hydraulic fluid to respective branches of said circuit, each branch having a fluid responsive displaceable work element, comprising the steps of:
   (a) positioning all said work elements in an extreme position;
   (b) placing said control valve in a neutral position;
   (c) locking out said feedback communication between said prime mover and said pump unit;
   (d) setting said prime mover to a reference RPM;
   (e) destroking said pump unit; and
   (f) comparing said change in prime mover RPM to a reference change in RPM whereby a change in RPM above a reference change in RPM indicates a leak in said circuit between said pump and control valve.

2. A method as claimed in claim 1 further comprising the steps of:
   (a) returning said pump to stroke;
   (b) returning said prime mover to reference RPM;
   (c) placing said control valve to further position, said work element associated with a respective one of said branches in a said extreme position;
   (d) comparing said change in prime mover RPM to a reference change in prime mover RPM whereby a change in RPM above reference change in RPM indicates a leak in said circuit branch; and
   (e) repeating steps (c) and (d) for a difference one of said branches.

* * * * *